Jan. 21, 1930. H. K. FAIRALL 1,744,459
METHOD OF MAKING STEREOSCOPIC FILM
Filed Dec. 22, 1925
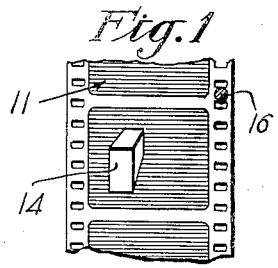
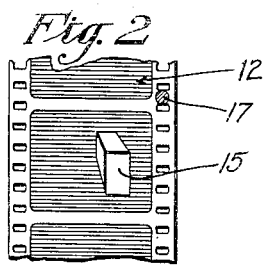
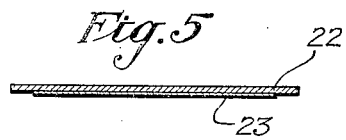
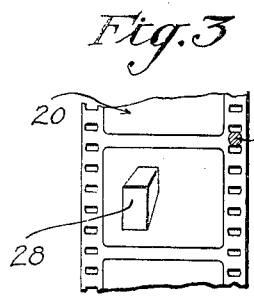
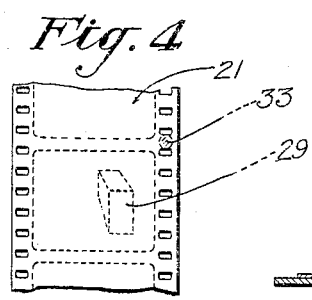
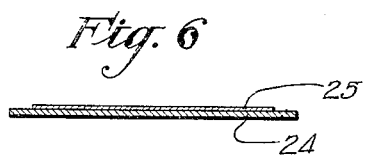
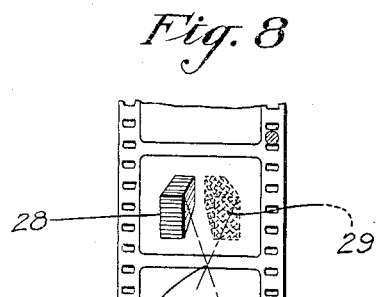
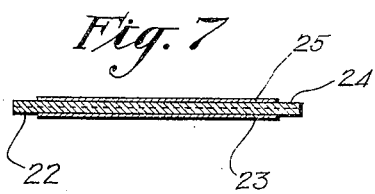
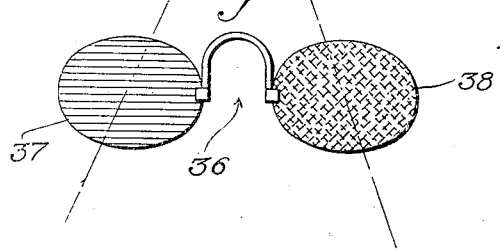
INVENTOR:
HARRY K. FAIRALL,
BY
ATTORNEY Patented Jan. 21, 1930

1,744,459

UNITED STATES PATENT OFFICE

HARRY K. FAIRALL, OF LOS ANGELES, CALIFORNIA, ASSIGNOR TO BINOCULAR STEREOSCOPIC FILM COMPANY, OF LOS ANGELES, CALIFORNIA, A CORPORATION OF CALIFORNIA

METHOD OF MAKING STEREOSCOPIC FILM

Application filed December 22, 1925. Serial No. 76,969.

An object of my invention is to provide a method of producing a stereoscopic film in which the right-hand image and the left-hand image are reversed, so that the right-hand image is on the left of the left-hand image and the left-hand image is on the right of the right-hand image, in order that they may be projected in this relationship on a screen.

A further object of my invention is to provide a method of producing a stereoscopic film wherein two images are combined in a single film, which has the advantage that a single standard projector may be used to project it, thus making the same available for use in any motion picture theatre without requiring special apparatus.

Another object of my invention is to provide a method of producing complementary colored positives which are combined in a single film containing both the right-hand and the left-hand images.

Another object of my invention is to provide a novel method of producing in a single film, two layers of emulsion, one containing the right-hand and the other the left-hand image, this being accomplished by providing a celluloid base and a gelatin emulsion containing the right-hand image and dyeing it one color, and a similar film containing the left-hand image and dyeing it another color and then combining the two into a single film.

A further object of the invention is to provide a novel method of making a stereoscopic film composed of two film strips which are made from half thickness stock so that the stereoscopic film will be of normal thickness.

A still further object of my invention is to provide a novel method of printing the right- and left-hand series of images upon separate films so that the films can be separately dyed and then cemented to form a single stereoscopic film.

Another object of the invention is to provide a novel method which includes the step of simultaneously branding the diapositive films so that the positive films formed from these will be branded in such a manner that by an observation of the brands in conjunction with the action of the photographs, the two positive films can be matched together with absolute accuracy and a perfect stereoscopic film thus produced.

A further object of my invention is to provide a novel method of forming a multi-image film which includes periodical branding and matching steps and including giving different colors to the secondary films prior to their being united.

Another object of my invention is to provide a method of forming corresponding diapositives and the final step of pointing positives and uniting these in a single film.

Other objects and advantages of the invention will be made evident hereinafter.

Referring to the drawings in which I illustrate my invention,

Fig. 1 is a view of a primary negative having a right hand stereoscopic image thereon.

Fig. 2 is a secondary negative having a left hand stereoscopic image thereon.

Fig. 3 is a view of a positive primary film strip having a right hand stereoscopic image thereon.

Fig. 4 is a secondary positive film strip having a left hand sterescopic image thereon.

Fig. 5 is a section of the primary film strip shown in Fig. 3.

Fig. 6 is a section of the secondary film strip shown in Fig. 4.

Fig. 7 is a section showing the primary and secondary film strips secured together.

Fig. 8 is the front view of the primary and secondary film strips after they have been secured together.

Fig. 9 is a view of the glasses employed in viewing the stereoscopic picture on a screen.

Referring to the drawings and particularly to Figs. 1 and 2, 11 indicates a primary negative film and 12 indicates a secondary negative film. The primary negative film 11 has a right hand stereoscopic image 14 fixed thereon, and the secondary negative film 12 has a left hand stereoscopic image 15 fixed thereon. The negatives 11 and 12 may be simultaneously exposed in a camera similar to the one shown and described in my application entitled Binocular nonstop motion picture camera, filed Nov. 21, 1925, Serial No. 70,489. The frames of these two negatives 11 and 12 being exposed at the same instant, the right hand and left hand stereoscopic images 14 and 15 are therefore produced at the same time and they constitute views of the same object taken at different view-points so that they are in reality stereoscopic images when compared with each other. The right and left hand images 14 and 15 correspond to the images of an object which would be seen by the left and right eyes. It should be noted that the films 11 and 12 are arranged so that the images occupy reverse positions, the reason for which will be explained later.

To insure perfect registry as to time the negatives 11 and 12 are marked along the edge portions thereof at intervals so that the frames of the two films may be accurately matched. The negative 11 is marked as indicated at 16 and the negative 12 is marked as indicated at 17. This marking is done in the camera by simultaneously opening two light ports, one of each film, so that when films are developed a black dot appears at regular intervals on each film.

Referring to Figs. 3 and 4, a positive primary 20 is made from the negative primary 11 and a positive secondary 21 is made from the negative secondary 12. The primary 20 as shown in Fig. 5 consists of a base 22 which is made of celluloid and an emulsion coating 23. The secondary 21 consists of a base 24 made of celluloid and an emulsion coating 25. If desired, the celluloid bases of the primary and secondary 20 and 21 may be conveniently made from half thickness stock so that when they are secured together, as shown in Fig. 7 and Fig. 8, they will provide a stereoscopic film which is of standard thickness and therefore may be used in an ordinary projecting machine, not requiring any special projecting apparatus.

Each frame of the primary 20 has a right hand stereoscopic image 28 fixed thereon and each frame of the secondary has a left hand stereoscopic image 29 fixed thereon. In order that the right and left hand stereoscopic images 28 and 29 will properly match when the two film strips are secured together back to back, it is necessary to have one of the images printed in reverse position. In the drawings I have shown the left hand stereoscopic image 29 reversed. By "reversed" is meant that the image 29 is printed through the celluloid base 24 of the secondary film strip so that when the primary and secondary film strips are cemented together they will be in the intended stereoscopic relationship, and when they are viewed through proper glasses as shown in Fig. 9 a true stereoscopic picture will be seen.

After the primary and secondary film strips have been exposed and developed, and the images fixed thereon, as shown in Figs. 3 and 4, they are cemented together as shown in Fig. 7. Before the strips are cemented together, however, it may be desirable to dye the images, the images of one strip being dyed in one color and the images of the other strip being dyed in a complementary color, it being common practice to employ orange and blue as complementary colors. Therefore, in the drawings I have shown the left hand image as being dyed orange and the right hand image as being dyed blue. It should be understood, however, that any other complementary colors may be employed if desired. It should also be understood that it is not absolutely necessary to dye the images before the primary and secondary film strips are secured together. If desired, the images may be dyed after the strips have been cemented together, this being possible by a flotation process. It should be understood that only the images are dyed. If the whole of the frames were colored, the orange and blue colors would be superimposed on the film and they would prevent any light from passing through the film onto the screen. By coloring only the images, it is possible to cast two images, one orange and the other blue, upon the screen. The primary film strip 20 has a printed spot 32 on one edge thereof, and the secondary film strip has a printed spot 33 on one edge thereof, at intervals of one foot or more. Owing to the fact that a great deal of clipping is necessary in the production of positive motion picture films, it is extremely important in the production of a stereoscopic film formed of two separately printed positives that a means be provided whereby the frames in these two positives which correspond in time of exposure be superimposed relative to each other. The uniting of the primary and secondary positive films so that corresponding frames are thus superimposed is practicably possible only by using the method of my invention which involves observation of the action of the frames of the films in connection with the positions of the images 32 and 33 of the black spots 16 and 17 printed on these films.

It is to be noted that the need for clipping out and then uniting corresponding portions of two individual positive films, which must be secured together face to face to form a single positive film, gives the spots 32 and 33 a utility in my process which is impossible in the finishing of a positive where this comprises only a single film. When the two strips are cemented together the spots 32 and 33 are aligned and it is therefore certain that the two images which are taken at the same time will be shown on the screen at the same time. This marking of the films is necessary, as while it is very easy to match the action within a foot, an exact match by mere comparison of action is very difficult. An absolutely perfect matching of the two films is necessary as the eye resents any imperfection therein.

When the primary and the secondary film strips have been secured together, the celluloid bases 22 and 24 form substantially a single homogeneous base which, since the two bases 22 and 24 are half size, form a resulting base which is of the thickness of an ordinary film.

The right hand and left hand stereoscopic images 28 and 29 occupy positions as shown in Fig. 8 on the stereoscopic film. It should be noted in this figure that the right hand image 28 is on the left of the left hand image 29 and the left hand image 29 is therefore on the right of the right hand image 28. Although superior results are obtained by this arrangement of images and such arrangement is highly desirable, it is not absolutely necessary and if desired the right and left hand images may be placed so that they are on the right and left hand sides of each other, respectively. The primary and secondary images are projected on a screen by means of a standard projector and are viewed by a spectator through glasses 36 having a left lens 37 which is blue and a right lens 38 which is orange. Therefore, the spectator sees the orange image with his left eye and the blue image with his right eye, each eye seeing a different image.

It will be understood then that the right eye sees the right image 28 through the orange eye-piece 38, and the left eye sees the left image 29 through the blue eye-piece 37. The lines of vision 40, indicated between Figs. 8 and 9 of the drawings, cross at a point 41. As previously pointed out, this crossing of the lines of vision of the two eyes greatly assists in bringing together and focusing the right and left hand images so that better results are obtained. This arrangement gives a resulting stereoscopic effect which is just the same as though the spectator saw the object itself in place of the right and left hand images on the screen.

It will be noted that my invention includes the conception of producing complementary colored positives which are combined into a single film containing both the right hand and the left hand images. The production of the negatives is facilitated by the use of my novel camera which not only exposes the right and left hand negatives simultaneously, but also marks them simultaneously at distances of one foot or more to facilitate matching the action positively. The developing and further treatment of the negatives require no special apparatus or processes. The production of the black and white positives from the negatives and the coloring of these positives also involve no special apparatus or knowledge except that one of the positives must be printed in reverse position through the celluloid. The cementing of the two positives together, back to back, is also a simple technical process. The resulting stereoscopic film is of standard thickness and may be projected from a standard projector by any operator without special instruction. It will therefore be seen that by my invention, using means well known in the art, I have produced a simple and practical means for making stereoscopic pictures available in any theatre, a result long sought but never before accomplished.

I claim as my invention:

1. A method of forming a multi-image motion picture film which comprises: taking a plurality of series of individual negative photographs of the same action on continuous films, one for each series, corresponding photographs of said series being taken substantially simultaneously; periodically marking said films while said photographs are being taken, to identify corresponding photographs of different series; printing positive photographs from said films on secondary films, matching said positive photographs by observation of the action on the photographs in connection with the positions of the prints of said marks on said secondary films so that corresponding photographs are opposite each other; and uniting said secondary films face to face when said positive photographs are so matched.

2. A method as in claim 1 in which said secondary films are given different colors prior to their being united.

3. A method of forming stereoscopic motion picture films which comprises: taking a plurality of series of individual negative photographs of the same action on continuous films, corresponding photographs of said series being taken from different positions substantially simultaneously; periodically marking said films while said photographs are being taken, to identify corresponding photographs of different series; clipping said films; and matching and uniting clipped portions of said films by an inspection of said photographs in connection with said marks so that the photographs corresponding in position on said films correspond in time of exposure.

4. A method of forming stereoscopic motion picture films which comprises: taking a plurality of series of individual negative photographs of the same action on continuous films, corresponding photographs of said series being taken from different positions substantially simultaneously; periodically marking said films while said photographs are being taken, to identify corresponding photographs of different series; clipping said films; matching and uniting clipped portions of said films by an inspection of said photographs in connection with said marks so that the photographs corresponding in position on said films correspond in time of exposure; printing positive photographs from said films on secondary films; matching said secondary films by observation of said positive photographs in connection with the positions of the prints of said brands on said secondary film so that corresponding photographs are opposite each other; and uniting said secondary films face to face when so matched.

5. A method as in claim 4 in which said secondary films are given different colors prior to their being united.

In testimony whereof, I have hereunto set my hand at Los Angeles, California, this 17th day of December, 1925.

HARRY K. FAIRALL.